United States Patent
Nozaki

(10) Patent No.: US 9,047,672 B2
(45) Date of Patent: Jun. 2, 2015

(54) IMAGE GENERATION APPARATUS, IMAGE GENERATION METHOD AND IMAGE GENERATION PROGRAM

(75) Inventor: Takeo Nozaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 548 days.

(21) Appl. No.: 13/515,733

(22) PCT Filed: Dec. 1, 2010

(86) PCT No.: PCT/JP2010/071457
§ 371 (c)(1),
(2), (4) Date: Jun. 13, 2012

(87) PCT Pub. No.: WO2011/074413
PCT Pub. Date: Jun. 23, 2011

(65) Prior Publication Data
US 2012/0249801 A1    Oct. 4, 2012

(30) Foreign Application Priority Data

Dec. 14, 2009   (JP) .................................. 2009-283504

(51) Int. Cl.
*H04N 5/33* (2006.01)
*G06K 9/00* (2006.01)
*G06K 9/34* (2006.01)
*G06T 5/00* (2006.01)

(52) U.S. Cl.
CPC ....... *G06T 5/008* (2013.01); *G06T 2207/10048* (2013.01)

(58) Field of Classification Search
None
See application file for complete search history.

(56) References Cited

U.S. PATENT DOCUMENTS

2013/0208125 A1 *   8/2013   Richardson et al. .......... 348/164

FOREIGN PATENT DOCUMENTS

| JP | 09-098293 A | 4/1997 |
|---|---|---|
| JP | 2006-041744 A | 2/2006 |
| JP | 2007-232552 A | 9/2007 |
| JP | 2007-322374 A | 12/2007 |
| JP | 2009-196926 A | 3/2011 |
| JP | 2009-254350 A | 5/2011 |

* cited by examiner

*Primary Examiner* — Dave Czekaj
*Assistant Examiner* — Nam Pham
(74) *Attorney, Agent, or Firm* — Sughrue Mion, PLLC

(57) ABSTRACT

An image generation apparatus is provided with: a resolution sensitivity conversion unit which generates different weight-averaged images by performing convolution operations on the infrared image with plural different weighted-filter images, and generates a resolution-sensitivity-converted image by adding luminance differences between the weight-averaged images to luminance values of the infrared image; a luminance shift calculating unit which sets the most frequently appearing luminance value of the resolution-sensitivity-converted image to an intermediate value in an enlarged range and as an intermediate luminance value, and generates a luminance-shifted image obtained by linearly shifting luminance values of the resolution-sensitivity-converted image in such a manner that the shifting corresponds to the intermediate luminance value and the enlarged range; and a luminance arithmetic operation unit which generates an arithmetically processed image by performing an arithmetic operation based on luminance differences between corresponding positions of the luminance-shifted image and a reverse shifted image.

8 Claims, 14 Drawing Sheets

FIG.3A $$W_3 = \begin{bmatrix} 1 & 1 & 1 \\ 1 & 1 & 1 \\ 1 & 1 & 1 \end{bmatrix} \times 1/9$$

FIG.3B $$W_5 = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \times 1/25$$

FIG.3C $$W_7 = \begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix} \times 1/49$$

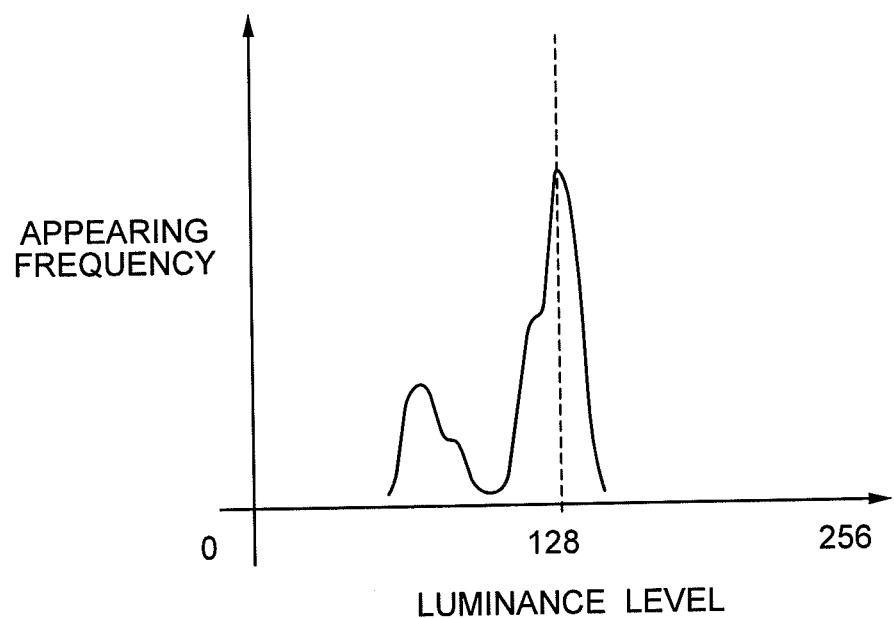

IMAGE GENERATION APPARATUS, IMAGE GENERATION METHOD AND IMAGE GENERATION PROGRAM

CROSS REFERENCE TO RELATED APPLICATIONS

This application is a National Stage of International Application No. PCT/JP2010/071457 filed Dec. 1, 2010, claiming priority based on Japanese Patent Application No. 2009-283504 filed Dec. 14, 2009, the contents of all of which are incorporated herein by reference in their entirety.

TECHNICAL FIELD

The present invention relates to an image processing apparatus which generates an image that is processed for detecting a target from an infrared image in which the target such as a navy ship is captured.

BACKGROUND ART

For search and rescue operations performed by aircrafts, pilots perform searching (probing) of a drifting person and a rescue boat on the sea surface by radio wave signals by a beacon such as a distress call, searching by visual inspection while flying over a searching sea area at a low altitude, searching based on an infrared camera image, etc.

In particular, the visibility and the viewing field become poor in nighttime and in a case of bad weather compared to the searching done in a fine weather and in daytime. Thus, it is difficult to find the target object such as a sufferer floating on the sea surface, a person within a navy ship, and the navy ship by performing the searching with the naked eyes and to capture it as an image detectable by an infrared camera.

Therefore, it takes time to find a person in a scene of saving the life, so that the survival rate becomes low. Further, there is generated a delay in finding the search target, which allows intrusions of suspicious characters such as navy ships and aircrafts of other countries.

For this, there have been developed an image information processing technique and an image identification support technique which effectively support viewing field searching by a prober through generating viewing field support information (image) for supporting a searcher to identify/discover the target object at an early stage by improving a contrast in the captured infrared image.

For example, known are: an infrared camera reduced in size through omitting a cooling function, which captures infrared images by an uncooled infrared sensor in which the S/N ratio for a noise is improved largely; an image processing system using such infrared camera; and the like.

Further, as a related technique, there is disclosed an infrared image processing system which captures an infrared image by loading a small-sized uncooled infrared camera on an aircraft or a flying object, processes the acquired infrared image, extracts/identifies the target object from the infrared image, and displays it (Patent Document 1).

Patent Document 1 separates infrared rays made incident from a target and from the background of the target into plan polarized light rays orthogonal to each other, receives the infrared rays by all image sensor in which two light receiving elements are arranged two-dimensionally, converts the infrared rays into electric signal amounts, and outputs a polarized light difference image signal acquired by finding a difference between electric signal amounts at a same coordinate position on two-dimensional coordinate between each of the image signals outputted after being converted into the electric signal amounts.

Further, a binary image signal acquired by binarizing the electric signal amount of the polarized light difference image signal based on a comparison with a threshold value is outputted by a combination of a polarized image capturing device which outputs a luminance image signal acquired by adding the electric signal amounts at the same coordinate position on the two-dimensional coordinate, and a threshold value database which stores a combination of the target and the background and the threshold value of the polarized light difference image signal with which the target and the background can be separated in a corresponding manner. Further, a target candidate is extracted by an image that is acquired by multiplying the value after performing binarization on the binarized image signal to the electric signal amount of a luminance image signal at the same position on the two-dimensional coordinate.

The invention depicted in Patent Document 1: uses the fact that there is a temperature difference in a target object and the background thereof in general when extracting the target such as floating object floating on the sea surface, a ship, a flying object in an airspace, and an obstacle of a low visibility in a low airspace; includes an optical system constituted with a surface deflection light receiving element which separates into P-wave and S-wave loaded in front of an infrared ray sensor; includes an appropriate captured image luminance arithmetic operation unit; and performs infrared image processing which extracts a target object by defining a point that is equal to or more than a prescribed temperature (luminance) as the target object.

Patent Document 1: Japanese Unexamined Patent Publication 2007-322374
Patent Document 2: Japanese Unexamined Patent Publication 2009-196926
Patent Document 3: Japanese Unexamined Patent Publication 2009-254350

However, with the invention depicted in Patent Document 1 described above, it is difficult to reduce the size since the optical system for separating into the P-wave and S-wave before the infrared ray sensor is a large-scaled structure.

Further, the background noise in the infrared captured image captured by an infrared sensor becomes large in a case where the temperature difference between a target and the background thereof becomes small when the background is heated partially by the sun light or the like or in a case where the noise such as the sea spray on the water surface is extensive. Thus, the contrast between the target object and the background cannot be acquired depending on the optical system, so that it becomes difficult to recognize/capture the target correctly. This results in having such inconvenience that the target object is misrecognized or overlooked.

Further, in cases where there are white-crested waves generated due to the bad weather or artificial sea sprays and the like generated by hovering of a helicopter, the target object shown in an infrared captured image is covered by the white-crested waves. Thus, the shape of the target appears different. Therefore, when the target object identification is done by image identification based on the infrared captured image, it is possible to cause such inconvenience that the target object is overlooked or a wrong target object is selected (screening).

An object of the present invention is to improve the inconveniences of the related technique, and to provide an image generation apparatus, an image generation method, and an image generation program for securely identifying the target object within an infrared image.

DISCLOSURE OF THE INVENTION

In order to achieve the foregoing object, the image generation apparatus according to the present invention is an image generation apparatus which includes: an optical unit which condenses infrared rays from an image capturing target containing a target object and acquires a specific wavelength band from the condensed infrared rays; an uncooled infrared image sensor which generates an infrared image corresponding to a temperature of the image capturing target based on the wavelength acquired by the optical unit; and an image processing unit which generates an arithmetically processed image by performing arithmetic processing on luminance values of the infrared image, wherein the image processing unit is characterized to include: a resolution sensitivity conversion module which generates a plurality of different weight-averaged images corresponding to a plurality of weighted-filter image of different pixel numbers by performing a convolution operation of filter coefficients of each of the weighted-filter images and luminance values at corresponding positions in the infrared image, and generates a resolution-sensitivity-converted image by adding luminance differences of the pixels of the different weight-averaged images to respective luminance values of the corresponding pixels of the infrared image; a luminance histogram arithmetic operation module which generates a luminance histogram that shows appearing frequency of the luminance value of each pixel that forms the resolution-sensitivity-converted image; a luminance level adjusting module which sets a gradation range of the resolution-sensitivity-converted image to an enlarged range set in advance, sets a most frequently appearing luminance value that is a luminance value whose appearing frequency in the luminance histogram is the maximum to an intermediate value in the enlarged range as an intermediate luminance value, and generates a luminance-shifted image by linearly shifting each luminance value of the resolution-sensitivity-converted image by corresponding to the enlarged range and the intermediate luminance value; and a luminance arithmetic operation processing module which generates a reverse shifted image in which light and shade of luminance levels of the luminance-shifted image are reversed, and generates the arithmetically processed image by performing arithmetic processing based on differences in the luminance values of the corresponding pixels in each of the reverse shifted image and the luminance-shifted image.

Further, the image generation method according to the present invention is an image generation method for generating an arithmetically processed image from an infrared image by using an image generation apparatus which includes: an uncooled infrared image sensor which condenses infrared rays from an image capturing target containing a target object and generates an infrared image from the infrared rays based on a temperature of the image capturing target; and an image processing unit which performs arithmetic processing on luminance values of the infrared image, and the method is characterized to include: generating weight-averaged images corresponding to a plurality of weighted-filter image of different pixel numbers by performing a convolution operation of filter coefficients of each of the weighted filter images and luminance values at corresponding positions in the infrared image, and generating a resolution-sensitivity-converted image by adding luminance differences of the pixels of the different weight-averaged images to respective luminance values of the corresponding pixels of the infrared image; generating a luminance histogram that shows appearing frequency of the luminance value of each pixel that forms the resolution-sensitivity-converted image; setting a gradation range of the resolution-sensitivity-converted image to an enlarged range set in advance; setting a most frequently appearing luminance value that is a luminance value whose appearing frequency in the luminance histogram is the maximum to an intermediate value of a luminance range width of the resolution-sensitivity-converted image as an intermediate luminance value; generating a luminance-shifted image by enlarging a gradation range of the resolution-converted image to the enlarged range set in advance and linearly shifting each luminance value other than the most frequently appearing luminance value of the resolution-sensitivity-converted image to the values with which a contrast relation between the intermediate value and the upper and lower limit values of the enlarged range is maintained; and generating a reverse shifted image in which light and shade of luminance levels of the luminance-shifted image are reversed, and generating the arithmetically processed image by performing arithmetic processing based on differences in the luminance values of the corresponding pixels in each of the reverse shifted image and the luminance-shifted image.

Further, the image generation program according to, the present invention is as image generation program for generating an arithmetically processed image from an infrared image to be used in an image generation apparatus which includes: an uncooled infrared image sensor which condenses infrared rays from an image capturing target containing a target object and generates the infrared image from the infrared rays based on a temperature of the image capturing target; and an image processing unit which performs arithmetic processing on luminance values of the infrared image, and the program causes a computer to execute: a resolution sensitivity conversion function which generates weight-averaged images corresponding to a plurality of weighted-filter image of different pixel numbers by performing a convolution operation of filter coefficients of each of the weighted-filter images and luminance values at corresponding positions in the infrared image, and generates a resolution-sensitivity-converted image by adding luminance differences of the pixels of the different weight-averaged images to respective luminance values of the corresponding pixels of the infrared image; a luminance histogram arithmetic operation function which generates a luminance histogram that shows appearing frequency of the luminance value of each pixel that forms the resolution-sensitivity-converted image; a luminance level adjusting function which sets a gradation range of the resolution-sensitivity-converted image to an enlarged range set in advance, sets a most frequently appearing luminance value that is a luminance value whose appearing frequency in the luminance histogram is the maximum to an intermediate value in the enlarged range as an intermediate luminance value, and generates a luminance-shifted image by linearly shifting each luminance value of the resolution-sensitivity-converted image by corresponding to the enlarged range and the intermediate luminance value; and a luminance arithmetic operation processing function which generates a reverse shifted image in which light and shade of luminance levels of the luminance-shifted image are reversed, and generates the arithmetically processed image by performing arithmetic processing based on differences in the luminance values of the corresponding pixels in each of the reverse shifted image and the luminance-shifted image.

The present invention is structured and functions in the manner described above. According to that, the present invention is structured to include: a module which generates a resolution-sensitivity-converted image by adding a luminance difference between different weight-averaged images generated by performing a convolution operation of a plurality of different weighted-filter images and an infrared image to a luminance value of the infrared image; a module which sets the most frequently appearing luminance value of the resolution-sensitivity-converted image to the intermediate value of an enlarged range as an intermediate luminance value, and generates a luminance-shifted image in which each luminance value of the resolution-sensitivity-converted image is linearly shifted by corresponding to the intermediate luminance value and the enlarged range; and a module which generates an arithmetically processed image by performing arithmetic operation processing based on a difference between luminance values of corresponding pixels of the luminance-shifted image and a reverse shifted image acquired by reversing the luminance-shifted image. Therefore, it is possible to provide the image generation apparatus, the image generation method, and the image generation program for generating an image in which the target is effectively displayed with emphasis based on the infrared image in which the target is captured.

BRIEF DESCRIPTION OF THE DRAWINGS

FIGS. 3A, 3B, and 3C are explanatory charts showing weight filters of the image generation apparatus disclosed in FIG. 1, respectively;

FIG. 7 is an explanatory chart showing a luminance histogram of a luminance-shifted image in which luminance of each pixel in the infrared image sensitivity-converted image of the image generation apparatus disclosed in FIG. 1 is linearly shifted;

BEST MODES FOR CARRYING OUT THE INVENTION (Exemplary Embodiment)

Now, basic structural contents regarding an exemplary embodiment of the invention will be described.

Figure 1:
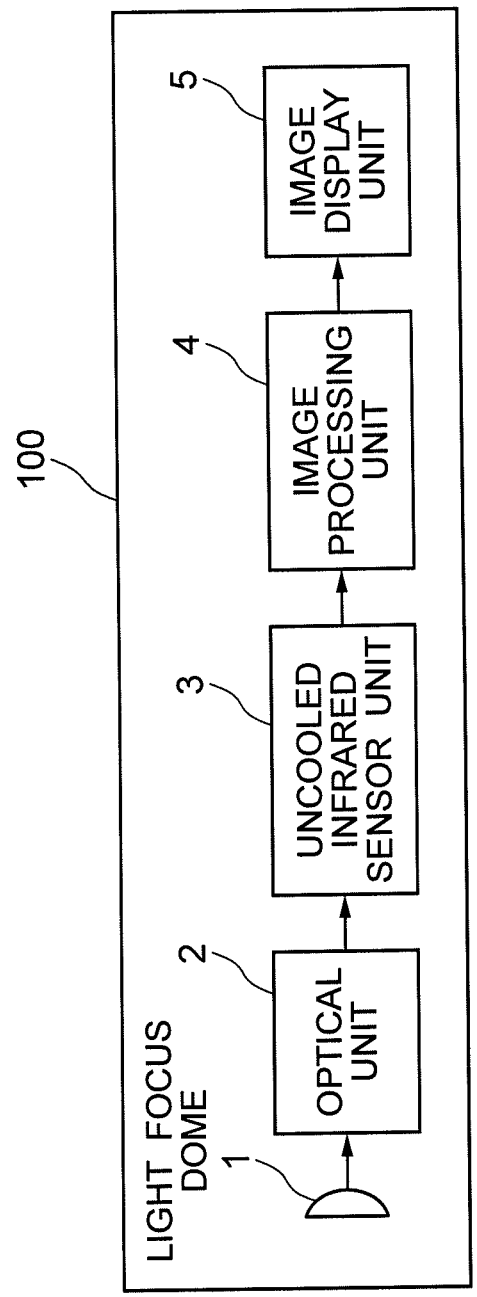
FIG. 1 is a schematic block diagram showing an exemplary embodiment of an image generation apparatus according to the invention.

As shown in FIG. 1, an image identification support apparatus (image generation apparatus) 100 as the exemplary embodiment includes: a far-infrared light focus dome 1 (referred to as "light focus dome" hereinafter) which collects infrared rays; an optical unit 2 which receives the collected infrared rays via a condensing lens set in advance; an uncooled infrared image sensor unit (an uncooled infrared image sensor) 3 which generates a heat image (infrared image) corresponding to the temperature of a captured target based on a wavelength (band) acquired via the optical unit 2; an image processing unit 4 which performs image processing on the infrared image generated by the uncooled infrared image sensor unit 3, and generates an arithmetically processed image in which the target object in the image is displayed with emphasis by performing processing for increasing the contrast of the target object with respect to the background region in the infrared image; and an image display unit 5 which outputs/displays the generated image.

Hereinafter, this will be described in details.

The light focus dome 1 for collecting the infrared rays includes the condensing lens for guiding the collected infrared rays into the optical unit 2.

The optical unit 2 is constituted by including an optical filter for performing filtering to detect and transmit a desired wavelength band set in advance.

The uncooled infrared image sensor unit 3 generates an infrared image showing the heat amount corresponding to the infrared ray passed through the optical filter of the optical unit 2. Note here that the generated infrared image is processed within the image processing unit 4 by each of the frames contained in the infrared image.

As shown in FIGS. 3A, 3B, and 3C, the image processing unit 4 includes: a resolution sensitivity conversion unit 6 which generates an averaged image of each frame of the infrared image by different-sized weight filters (weighted-filter images) of the infrared image, and generates an infrared resolution-sensitivity-converted image by adding a difference image as the difference of each of the averaged value images to the infrared image; a histogram calculating unit 7 which calculates a luminance histogram of each frame that is a region to be the target of image processing included in the generated infrared resolution-sensitivity-converted image, and calculates the luminance level whose appearing frequency is the highest as the most frequently appearing luminance level; a luminance shift calculating unit 8 which generates a luminance-shifted image by linearly converting the luminance values of each frame of the infrared resolution-sensitivity-converted image in such a manner that the most frequently appearing luminance level of the histogram becomes the intermediate value of the display gradation number; and a reversed image processing unit 9 which generates a reverse shifted image by reversing the luminance level based on the luminance-shifted image; and a luminance arithmetic operation unit 10 which performs division processing or subtraction processing of the luminance of the mutually corresponding pixels based on the luminance-shifted image and the reverse shifted image.

Further, the image processing unit 4 is constituted with: a feature detection unit 11 which generates an intermediate processed image (division processed image, subtraction processed image) from the division processed or subtraction processed image based on a gain coefficient, and performs appropriate filtering on the luminance information within the intermediated processed image; a contrast enlarging unit 12 which performs processing for improving the contrast of the intermediate processed image 1; and a binarization processing unit 13 which generates an image in which the target object is displayed with emphasis with respect to the background by applying binarization processing by using a specific luminance level as a threshold value on the image to which the contrast improving processing has been performed.

The resolution sensitivity conversion unit 6 includes: an original image receiving function which receives the infrared image sent in from the uncooled infrared image sensor unit 3; and a luminance level detecting function which detects the luminance levels of each pixel contained in each frame data by having each frame (frame data) 6a that is the region of the image processing target of the infrared image (original image) as a unit.

Note that the luminance level of each pixel contained in the frame data 6a shows the signal of the image luminance level that is proportional to the temperature of the heat source detected by a pixel unit by the infrared sensor provided to the uncooled infrared sensor unit 3.

Further, the resolution sensitivity conversion unit 6 includes: an averaged image generating function which performs weight averaging processing by using weight filters of different sizes on the infrared image to generate weight-averaged images thereby; and an infrared resolution-sensitivity-converted image generating function which generates a difference image of a plurality of acquired weigh-averaged images, and generates an infrared resolution-sensitivity-converted image 7a by adding the luminance value of the difference image to the luminance value of the infrared image as the original image.

For executing the averaged image generating function, the resolution sensitivity conversion unit 6 includes a weight averaging processing function which performs a convolution operation on the luminance values of the corresponding position addresses within the infrared image 6a regarding the filter coefficients set to each of the different-sized weighted-filter images (shown in FIGS. 3A, 3B, and 3C) based on Expression 1 shown below.

Thereby, the resolution sensitivity conversion unit 6 generates a plurality of different averaged images (FIGS. 4B, 4C, and 4D) corresponding to respective weighted-filter images set in advance.

[Expression 1]

$$G_n[x, y] = \sum_{l=-1}^{1} \sum_{k=-1}^{1} I[x+k, y+l] \cdot w[k][l]$$ [Equation 1]

$$W_N = w[k][l]$$

Note that all of $W_N$ as the filter coefficients of the weighted-filter images may not necessarily have to be all the same in the filter image. Further, the filter coefficient may be set to have the weight according to the distance from the processing center pixel position or set to have greater weight at the processing center pixel position in order to emphasize the high frequency region like an edge.

Further, the resolution sensitivity conversion unit 6 generates a difference image of the acquired different weight-averaged images, and performs processing for adding the luminance value of the difference image to the luminance value of the corresponding pixel of the infrared image (frame data 6a) based on Equation 2 shown below. Thereby, the infrared resolution-sensitivity-converted image 7a is generated.

Thereby, the resolution sensitivity of the target in the generated infrared resolution-sensitivity-converted image is improved compared to that of the infrared image.

It is so defined here that the luminance value of each pixel in the infrared resolution-sensitivity-converted image 7a is A'[x, y], the luminance value of each pixel in the frame data 6a is A[x, y], and the luminance value difference between the respective pixels of the difference image is ($G_n[x, y]-G_{n-1}[x, y]$).

Further, in a case where the luminance value difference calculated when generating the difference image becomes minus, K (128 in case of 256 gradations) as the intermediate value of the dynamic range of the luminance is added in order not to lose the difference information.

$$A'[x,y]=A[x,y]+\Sigma\{G_n[x,y]-G_{n-1}[x,y]+K\}$$ [Equation 2]

The histogram calculating unit 7 includes: a resolution sensitivity converted image receiving function which receives an infrared resolution-sensitivity-converted image 6b put into an image by the resolution sensitivity conversion done by the resolution sensitivity conversion unit 6; and a luminance level detecting function which detects the luminance level of each pixel contained in the infrared resolution-sensitivity-converted image by taking each frame (frame data) in the infrared resolution-sensitivity-converted image 6b as a unit.

The histogram calculating unit 7 includes a histogram generating function which generates a histogram (luminance histogram) showing the relation between the luminance levels of each frame of the infrared resolution-sensitivity-converted image and the appearing frequency based on the detected luminance levels.

Further, the histogram calculating unit 7 includes a most frequent value extracting function which extracts the most frequent value (the most frequently appearing luminance value: the most frequent value of the luminance histogram) as the luminance level value where the appearing frequency becomes the maximum among the luminance values of each frame.

The luminance shift calculating unit (luminance level adjusting unit) 8 includes a luminance-shifted image generating function which sets the luminance level of the pixel having the most frequent value of the frequency information of the luminance levels extracted by the histogram calculating unit 7 to the intermediate value of the luminance range width (as the intermediate luminance value), and generates a luminance-shifted image by performing the processing for linearly shifting each luminance value in the frame data (6*b*) while maintaining the contrast relation with respect to the intermediate luminance value.

Figure 6:
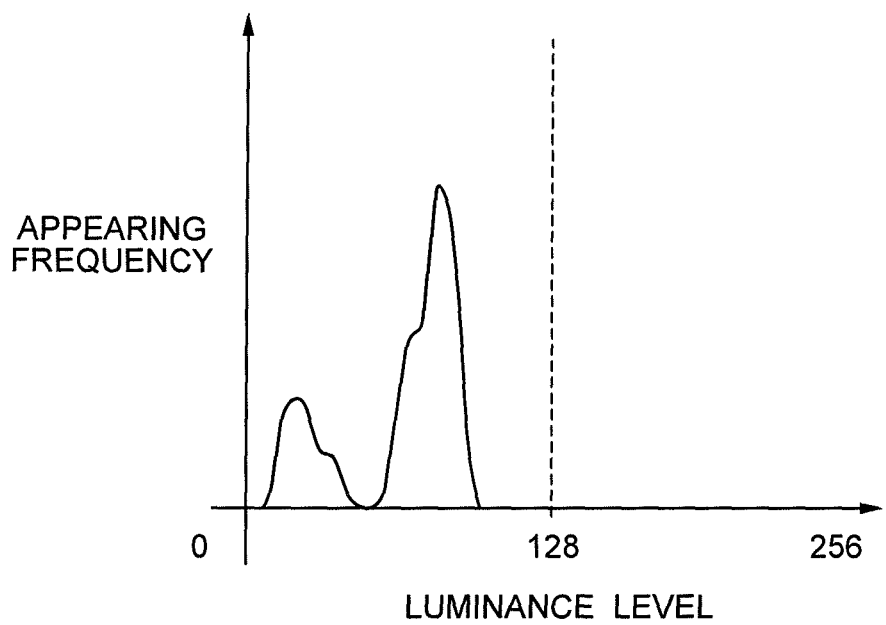
FIG. 6 is an explanatory chart showing a luminance histogram of 1-frame data of the infrared image sensitivity-converted image of the image generation apparatus disclosed in FIG. 1.

For example, when the luminance level of the infrared sensor image (infrared image) is of 256 gradations, the luminance shift calculating unit 8 sets the luminance level of the most frequent value in the histogram (FIG. 6) of the frame data 7*a* generated after the resolution sensitivity conversion processing to 128 (intermediate luminance value) as the intermediate value as shown in FIG. 7, and performs linear shift conversion of other luminance levels within the frame by using it as the reference so as to generate a luminance-shifted image 8*a*.

Note that the luminance levels exceeding the maximum luminance 255 are considered as 255 and those equal to or less than the minimum luminance 0 are considered as 0 for calculation.

Further, the luminance shift calculating unit 8 includes a luminance-shifted image transferring function which duplicates the generated luminance-shifted image 8*a*, stores it to a luminance-shifted image storage unit set in advance within the image processing unit 4, and transmits it to the reversed image processing unit 9 and the luminance arithmetic operation unit 10, respectively.

The reversed image processing unit 9 includes a reversed image generating function which holds the luminance-shifted image 8*a* within a capturing memory, and generates a reverse shifted image in which the gradations of the luminance-shifted image 8*a* are reversed (e.g., white-to-black reversion).

The luminance arithmetic operation unit 10 receives the reverse shifted image 9*a* sent in from the reversed image unit 8, and calculates each of the in-frame luminance average values of the luminance-shifted image 8*a* and the reverse shifted image 9*a* stored in the luminance-shifted image storage unit, respectively.

Note here that the luminance arithmetic operation unit 10 includes a luminance average value setting function which sets the image with the larger luminance average out of the luminance-shifted image 8*a* and the reverse shifted image 9*a* as a large luminance image, and the image with the smaller luminance average as a small luminance image, respectively.

Further, the luminance arithmetic operation unit 10 includes a luminance value division processing function which performs processing for dividing the luminance value of the image whose luminance average is larger by the luminance value of the image whose luminance average is smaller regarding the luminance values of the position addresses corresponding to each of the luminance-shifted image 8*a* and the reverse shifted image 9*a* based on Equation 3 shown below.

When performing the division processing, the luminance arithmetic operation unit 10 multiplies gain K (e.g., K=128) by the arithmetic operation result so that the value becomes equal to the intermediate value of the arithmetic operation result.

$$Id(x,y) = K \times (A(x,y)/B(x,y)) \qquad \text{[Equation 3]}$$

Further, the luminance arithmetic operation unit 10 generates a division processed image 1 (10*a*) constituted with Id(x, y) in which the contrast of the target object in the image is emphasized, and sends out the division processed image 10*a* to the feature detection unit 11.

Further, the luminance arithmetic operation unit 10 may be set to perform processing for subtracting the luminance value of the image whose luminance average is smaller from the luminance value of the image whose luminance average is larger regarding the luminance values of the position addresses corresponding to each of the luminance-shifted image 8*a* and the reverse shifted image 9*a* based on Equation 4 shown below (a luminance value subtraction processing function).

When performing the subtraction processing, the luminance arithmetic operation unit 10 adds the gain value (e.g., K=128) to the subtraction result within an absolute value so that the intermediate value levels as the arithmetic operation results at each of the position addresses become equal.

$$Is(x,y) = |A(x,y) - B(x,y)| + K \qquad \text{[Equation 4]}$$

Thereby, the luminance arithmetic operation unit 10 generates a subtraction processed image 11 (10*a'*) constituted with calculated Is(x, y), and sends out the subtraction processed image 10*a'* to the feature detection unit 11.

It is desirable to employ the arithmetic operation with which the luminance difference of the target object with respect to the background becomes larger, regarding whether the division processing or the subtraction processing is to be performed within the luminance arithmetic operation unit 10. However, it is also possible to make selection by comparing the images acquired in the final results.

The feature detection unit 11 includes a filtering processing function which generates a filtering image 11*a* by performing filtering processing for eliminating the luminance region (pixels) smaller than the luminance frequency set in advance from the image on the division processed image 10*a* (or the subtraction processed image 10*a'*) sent in from the luminance arithmetic operation unit 10. Thereby, the luminance in the vicinity of the most frequent value in the image (the filtering image 11*a*) can be increased relatively.

The contrast enlarging unit 12 includes a contrast enlarging processing function which selects the region (referred to as "luminance region") with the luminance of equal to or larger than the luminance value set in advance from the filtering image 11*a*, and generates a contrast enlarged image 12*a* in which the contrast is enlarged by enlarging the luminance range of the luminance region linearly in such a manner that the vicinity of the most frequent value becomes the maximum based on the most frequent value of the selected luminance.

The binarization processing unit 13 includes a binarization processing function which generates a binary image 13*a* by performing threshold value processing set in advance on the luminance of each pixel of the contrast extended image 12*a*.

Further, the binarization processing unit 13 may also be set to extract the target object from the binary image 13*a* outputted to the image display unit 5, and performs image emphasized display of the target object.

Note here that the binarization processing unit 13 may be set to superimpose a mark set by corresponding to the extracted target object on the target object within the binary image 13a to display, for example, as a method for the image emphasized display.

As described above, according to the exemplary embodiment, the filtering processing and the contrast enlarging is executed on the subtraction processed image 10' that is acquired by generating the luminance-shifted image and the reverse shifted image thereof in which the most frequently appearing luminance level of the luminance distribution of the infrared resolution-sensitivity-converted image generated by improving the resolution sensitivity of the infrared image (original image) captured by the uncooled infrared sensor unit 3 is aligned with the intermediate value of the dynamic range and by performing division or subtraction processing of the luminance levels at the positions of the same pixels in the both images. Thereby, it is possible to suppress the luminance variation in the background occupying most of the luminance distribution in the original image, and to enlarge the luminance difference of the target object with respect to the background.

Thereby, the image identification support apparatus 100 can generate the image in which the resolution sensitivity and the contrast of the image captured by the uncooled infrared sensor are improved, and the image can be utilized for probing floating objects between the waves such as a person, a rescue boat, and the like in a rescue operation at the sea, for example.

Further, the image identification support apparatus 100 can separate the target object and the background noise such as the white-crested waves in the infrared image in the process of generating the image and, further, can lighten the background noise. This makes it possible to improve the image contrast of the target object, so that the target object such as a floating object and a ship can be extracted effectively. Thereby, the user of the image identification support apparatus 100 can identify the target within the image more securely and easily.
(Explanations Regarding Actions of Exemplary Embodiment)

Next, outline of the actions of the exemplary embodiment will be described.

Figure 4A:
FIG. 4A is an explanatory chart showing an example of an infrared image of the image generation apparatus disclosed in FIG. 1, FIGS. 4B, 4C, 4D are explanatory charts showing examples of an averaged image generated by corresponding to FIGS. 3A, 3B, 3C.

First, the resolution sensitivity conversion unit 6 of the image processing unit 4 generates a plurality of different weight-averaged images, respectively, by performing a convolution operation on the luminance values of the pixels contained in the captured infrared image by utilizing a plurality of different sized weight smoothing filters (FIGS. 3A, 3B, 3C), generates difference images (FIGS. 4A, 4B, 4C) between the weight-averaged images, and generates infrared resolution-sensitivity-converted images by performing processing for adding the difference images to the infrared image (a resolution sensitivity conversion processing step). Then, the histogram calculating unit 7 generates a luminance histogram showing the appearing frequency of the luminance values of the pixels contained in the infrared resolution-sensitivity-converted image (a luminance histogram calculation step). Thereafter, the luminance shift calculating unit 8 sets a gradation range of the resolution-sensitivity-converted image to an enlarged range (a luminance range width) set in advance, sets the most frequently appearing luminance value as the luminance value whose appearing frequency in the luminance histogram is the maximum as the intermediate luminance value of the enlarged range, and generates a luminance-shifted image in which each of the luminance values in the resolution-sensitivity-converted image is linearly shifted by corresponding to the enlarged range while maintaining the contrast relation with respect to the intermediate luminance value and the enlarged range (a luminance level adjusting step). Then, the reversed image processing unit 9 generates a reverse shifted image in which the luminance levels of the luminance-shifted image are reversed (a reverse shifted image generating step), and the luminance arithmetic operation unit 10 generates an arithmetic operation processed image by performing arithmetic operation processing based on the difference in the luminance values at the respective corresponding positions in the luminance-shifted image and the reverse shifted image (a luminance calculation processing step).

Note here that the execution contents of the resolution sensitivity conversion processing step, the luminance histogram arithmetic operation step, the luminance level adjusting step, the reverse shifted image generating step, and the luminance arithmetic operation processing step may be put into a program to have it executed by a computer.

Figure 2:
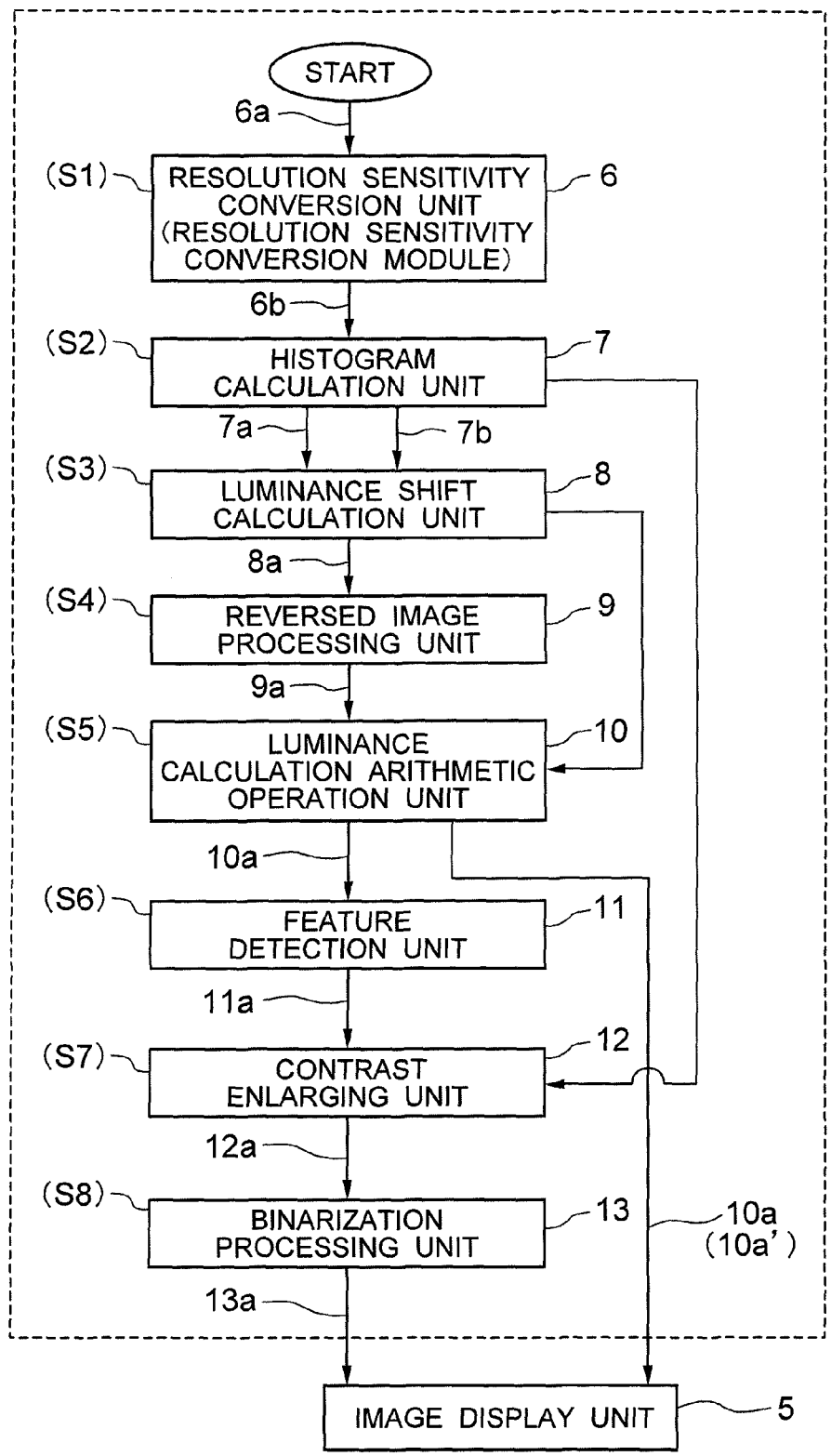
FIG. 2 shows a schematic block diagram showing an example of the inside structure of an image processing unit of the image generation apparatus disclosed in FIG. 1, and shows a flowchart showing operation processing steps thereof.

Next, a processing action done by the image processing unit 4 of the image identification support apparatus 100 for extracting the target object will be described by referring to FIG. 2.

First, in the image processing unit 4, the resolution sensitivity conversion unit 6 receives the infrared image 6a that has been put into an image by the uncooled infrared image sensor unit 3, and detects the luminance levels of each pixel contained therein by having each of the frames (frame data) of the infrared image 6a as a unit.

It is to be noted that the luminance level of the infrared image 6a shows the luminance level that is proportional to the temperature of the heat source detected by the infrared sensor provided to the uncooled infrared sensor unit 3 by a pixel unit.

Then, the resolution sensitivity conversion unit 6 generates a plurality of indistinctive weight-averaged images according to each filter size by using the plurality of different sized weight smoothing filters for the luminance values of the pixels contained in each frame of the infrared image.

Regarding the weight averaging processing done by the resolution sensitivity conversion unit 6, weight averaging processing is performed through executing convolution operation processing by using a plurality of difference sized weight filters $W_N$ (weight (smoothing) filter images: FIGS. 3A, 3B, 3C) set in advance on the luminance values of the corresponding position addresses (pixels) of the infrared image 6a as shown in Equation 1 shown below to generate the averaged images corresponding to each weighed-filter image.

The averaged image is constituted with luminance value $G_n(x, y)$ of Equation 1 shown below. Note here that (x, y) shows the position (position address) of the pixel.

[Expression 2]

$$G_n[x, y] = \sum_{l=-1}^{1} \sum_{k=-1}^{1} I[x+k, y+l] \cdot w[k][l]$$ [Equation 1]

$$W_N = w[k][l]$$

As shown in FIG. 3, regarding the weight filter $W_N$, the coefficients for all the pixels may not necessarily have to be the same. Further, the filter coefficient may be set to have the weight according to the distance from the processing center pixel position or set to have greater weight to the processing center pixel position in order to emphasize the high frequency region like an image edge.

Figure 4D:
FIG. 4E is an explanatory chart showing an example of an infrared image sensitivity-converted image generated based on the infrared image and the averaged image.
Figure 4B:
Figure 4E:
Figure 4C:

Note here that FIGS. 3A, 3B, and 3C show the weight filters of the filter size N=3, N=5, and N=7, respectively, and FIGS. 4B, 4C, and 4D show the averaged images that are averaging processed by the corresponding filter sizes, respectively.

The averaged images become indistinctive images in which the high frequency components according to the filter sizes are eliminated gradually with respect to the original infrared image due to the averaging processing.

Then, when the difference images of a plurality of different weight averaged images are generated as described above, the resolution sensitivity conversion unit 6 generates an infrared resolution sensitivity converted image 6b (A'(x, y)) by performing processing for adding the luminance values of the difference images to the original infrared image 6a (A(x, y)) based on Equation 2 shown below, and transmits the infrared resolution sensitivity converted image 6b to the histogram calculating unit 7.

$$A'[x,y] = A(x,y) + \Sigma\{G_n(x,y) - G_{n-1}(x,y) + K\}$$ [Equation 2]

Specifically, the resolution sensitivity conversion unit 6 sets an image acquired by subtracting FIG. 4C from FIG. 4B and a difference image acquired by subtracting FIG. 4D from FIG. 4C, and adds the luminance values of the difference images to each of the luminance values of the original infrared image (FIG. 4C), respectively.

It is to be noted that K (128 in case of 256 gradations) as the intermediate value of the dynamic range of the luminance is added in advance, so that the difference information of a case where the luminance difference becomes minus is not lost when generating the difference images of different sized filters as shown in Equation 2 shown in the above.

Here, FIG. 4E shows the infrared resolution-sensitivity-converted image 6b in which the resolution sensitivity is improved by performing arithmetic operation processing based on Equation 2 on the infrared image (FIG. 4A) acquired by imaging the frame data of the uncooled infrared sensor.

Then, the histogram calculating unit (luminance histogram calculating unit) 7 detects the luminance levels of each pixel contained in each frame by taking each frame (frame data) of the infrared resolution-sensitivity-converted image as a unit.

Figure 9:
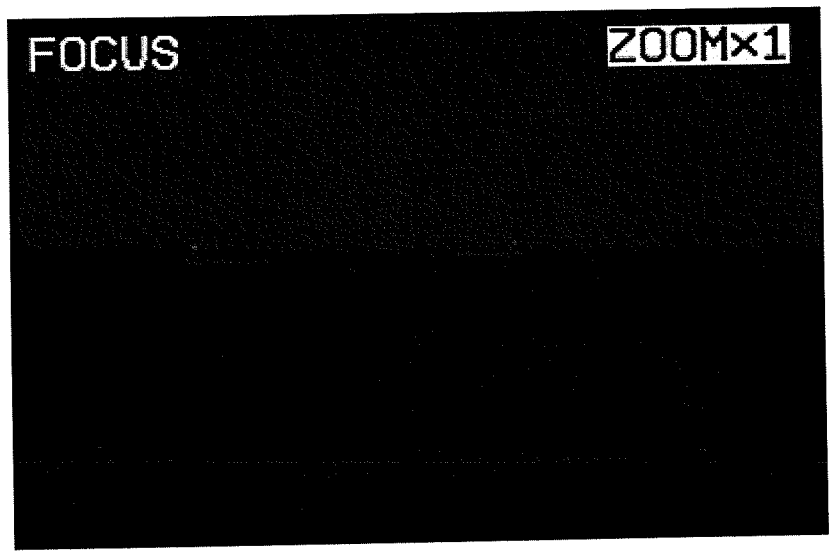
FIG. 9 is an explanatory chart showing an example of an infrared image sensitivity-converted image in which a floating object on the sea surface is captured according to the image generation apparatus disclosed in FIG. 1.
Figure 10:
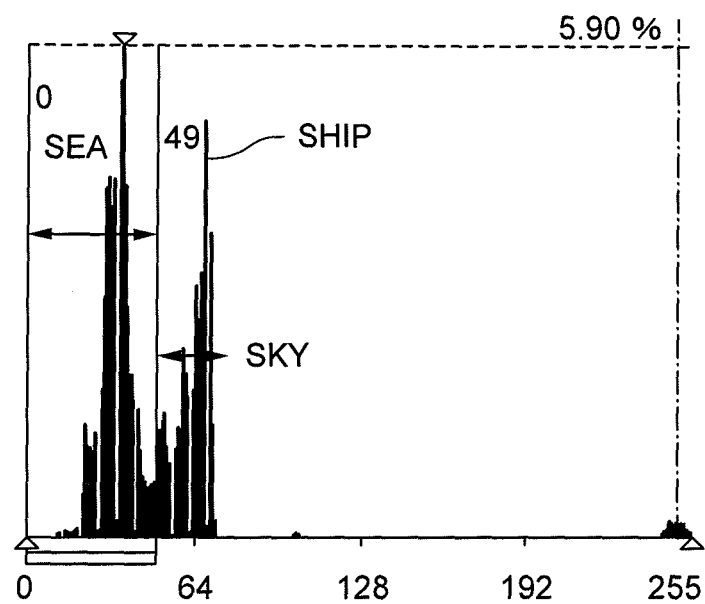
FIG. 10 is an explanatory chart showing an example of a luminance histogram of the infrared image sensitivity-converted image disclosed in FIG. 9.

Here, FIG. 9 shows the infrared resolution-converted image in which the resolution sensitivity of the image (infrared image) of a ship traveling on the sea surface captured by the uncooled infrared sensor unit 3 is converted.

Then, the histogram calculating unit 7 generates a histogram (FIG. 4) showing the relation between the luminance levels and the appearing frequency in each frame by corresponding to the frame number of each of the captured frames.

Further, the histogram calculating unit 7 transfers the maximum luminance value (most frequently appearing luminance value) 7b as the luminance level value of the maximum frequency of the histogram of each frame and the frame data 7a as the processing target of the generated infrared resolution-sensitivity-converted image to the luminance shift calculating unit 8 (step S2).

Then, the luminance shift calculating unit 8 sets the gradation range of the infrared resolution-sensitivity-converted image to the luminance display range (enlarged range) set in advance, and sets the luminance level of the most frequent value 7b of the luminance histogram corresponding to each frame data 7a of the infrared resolution-sensitivity-converted image as the intermediate value (intermediate luminance value) of the luminance display range (enlarged range).

Note here that the luminance shift calculating unit 8 performs processing for generating a luminance-shifted image by linearly converting each luminance value of the infrared resolution-sensitivity-converted image by corresponding to the intermediate luminance value.

Specifically, when the luminance display range (enlarged range) acquired by enlarging and setting the gradation range of the infrared resolution-sensitivity-converted image is of 256 gradations, the luminance shift calculating unit 8 sets the most frequently appearing luminance level in the histogram (FIG. 4) of the generated frame data 6a to 128 as the intermediate value as shown in FIG. 5, and linearly shifts (converts) the luminance levels within the frame data 7a by having it as the reference by corresponding to the luminance display range set in advance to generate the luminance-shifted image 8a.

Thereby, the luminance levels of the frame data 7a are converted to the values (luminance levels) with which the contrast relation between the upper-limit and lower-limit levels of the enlarged range and the intermediate luminance values can be maintained.

The shifted luminance levels exceeding the maximum luminance 255 are considered as 255, and the luminance levels equal to or less than the minimum luminance 0 are considered as 0 for calculation.

Further, the luminance shift calculating unit 8 duplicates the generated luminance-shifted image 8a, and transmits the luminance-shifted image 8a to the reversed image processing unit 9 and the luminance arithmetic operation unit 10, respectively (step S3).

Then, the reversed image processing unit 9 generates the reverse shifted image 9a in which the gradations of the luminance-shifted image 8a are reversed (black-to-white reversion, for example), and sends it to the luminance arithmetic operation unit 10 (step S4).

Then, the luminance arithmetic operation unit 10 receives the reverse shifted image 9a sent from the reversed image unit 8, and calculates each of the in-frame luminance average values of the luminance-shifted image 8a and the reverse shifted image 9a stored in the luminance-shifted image storage unit, respectively.

Note here that it is so defined that the luminance value in the image whose luminance average value is larger out of the both images (the luminance-shifted image 8a and the reverse shifted image 9a) is A(x, y) and the other image is B(x, y). Note that (x, y) shows the position address of the pixel within each frame.

(Division Processing)

The luminance arithmetic operation unit 10 performs processing for dividing the luminance value of the image whose luminance average is larger by the luminance value of the image whose luminance average is smaller regarding the luminance values of the position addresses corresponding to each of the luminance-shifted image 8a and the reverse shifted image 9a based on Equation 3 shown below.

When performing the division processing, the luminance arithmetic operation unit 10 multiplies the gain K (e.g., K=128) set in advance by the arithmetic operation result so that the value becomes equal to the intermediate value of the arithmetic operation result.

$$Id(x,y) = K \times (A(x,y)/B(x,y))$$ [Equation 3]

Thereby, the luminance arithmetic operation unit 10 generates the division processed image 1 (10a) constituted with Id(x, y) in which the contrast of the target object in the image is emphasized.

(Subtraction Processing)

Instead of the division processing, the luminance arithmetic operation unit 10 may be set to perform processing for subtracting the luminance value of the image whose luminance average is smaller from the luminance value of the image whose luminance average is larger regarding the luminance values of the position addresses corresponding to each of the luminance-shifted image 8a and the reverse shifted image 9a based on Equation 4 shown below.

When performing the subtraction processing by the luminance arithmetic operation unit 10, it is designed to add the gain value K (e.g., K=128) set in advance to the arithmetic operation result so that the intermediate value levels as the arithmetic operation results at each of the position addresses become equal.

$$Is(x,y)=|A(x,y)-B(x,y)|+K \quad \text{[Equation 4]}$$

Thereby, the luminance arithmetic operation unit 10 generates the subtraction processed image 11 (10a') constituted with calculated Is(x, y) in which the contrast of the target object in the image is emphasized.

It is desirable to employ the arithmetic operation with which the luminance difference of the target object with respect to the background becomes larger, regarding whether the division processing or the subtraction processing of the luminance values in the luminance-shifted image 8a and the reverse shifted image 9a is to be performed within the luminance arithmetic operation unit 10. However, it is also possible to make selection by comparing the arithmetically processed images acquired in the final results.

Then, the luminance arithmetic operation unit 10 inputs the generated division processed image 10a or the subtraction processed image 10a' to the feature detection unit 11 (step S5).

Note here that the luminance arithmetic operation unit 10 may be set to send the generated division processed image 10a or the subtraction processed image 10a' to the image display unit 5 as a through image when there is a luminance difference of more than a specific amount between the background image and the target object within the infrared resolution-sensitivity-converted image.

In that case, the division processed image 10a or the subtraction processed image 10a' are displayed on the image display unit 5 as the arithmetically processed image.

Figure 8A:
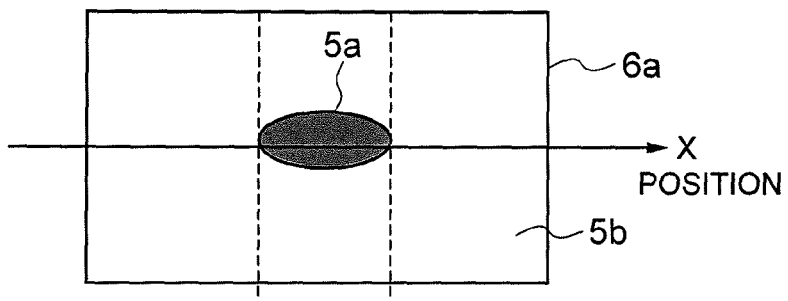
FIG. 8A is a schematic explanatory chart of 1-frame data of the infrared image sensitivity-converted image of the image generation apparatus disclosed in FIG. 1.

Here, the content of the processing for emphasizing the contrast of the target object within the image done by the luminance arithmetic operation unit 10 will be described. Here, explanations will be provided by referring to FIG. 5A and FIG. 8A which schematically show the frame data 7a of the infrared resolution-sensitivity-converted image.

Figure 5A:
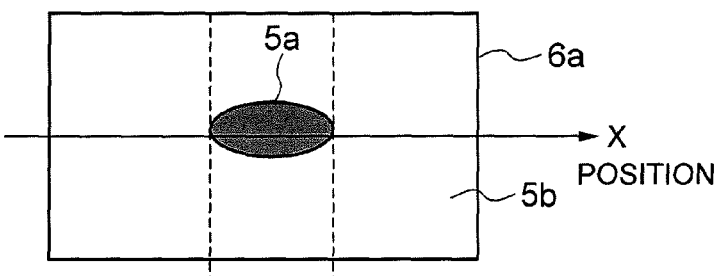
FIG. 5A is a schematic explanatory chart of the infrared image sensitivity-converted image of the image generation apparatus disclosed in FIG. 1.
Figure 5B:
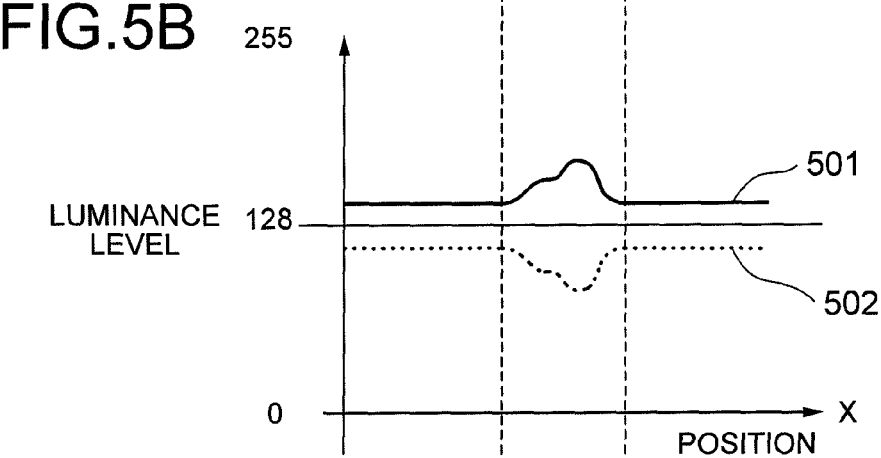
FIG. 5B is an explanatory chart showing a luminance profile of a luminance-shifted image of the infrared image sensitivity-converted image and its reverse shifted image.
Figure 8B:
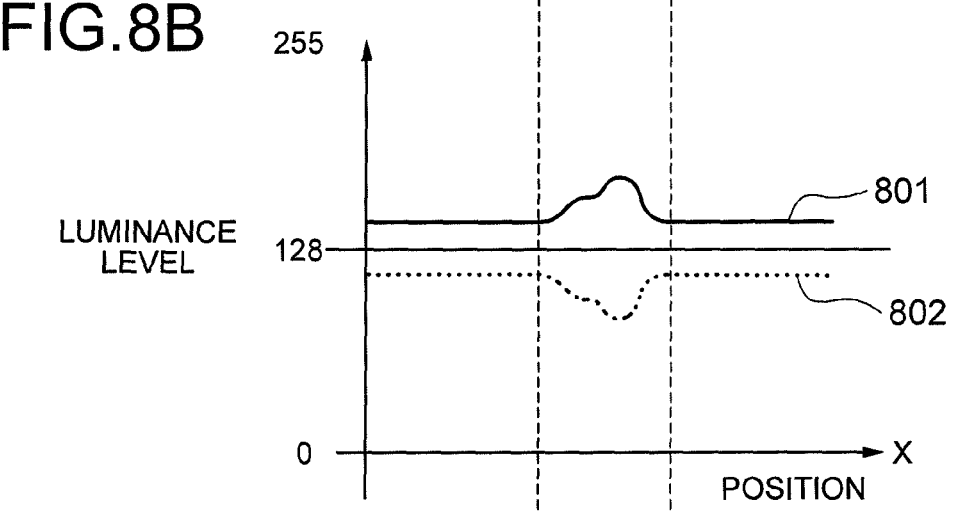
FIG. 8B is an explanatory chart showing a luminance profile of a luminance-shifted image of the infrared image sensitivity-converted image and its reverse shifted image.
Figure 8C:
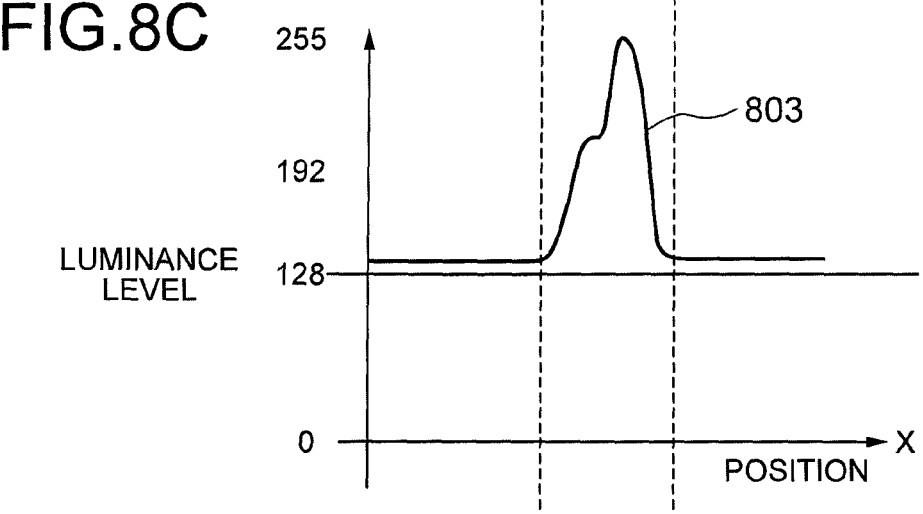
FIG. 8C is an explanatory chart showing a luminance profile of a division processed image that is a result of performing division processing on the image of FIG. 8B.

Further, 501 in FIG. 5B is a luminance profile of the X-direction going through the target object 5a in FIG. 5A, and 502 in FIG. 5B is a luminance profile going through the target object 5a in the reverse shifted image 9a in which the luminance of the luminance-shifted image 8a is reversed. Similarly, 801 in FIG. 8B is a luminance profile of the X-direction going through the target object 5a in FIG. 8A, and 802 in FIG. 8C is a luminance profile going through the target object 5a in the reverse shifted image 9a in which the luminance of the luminance-shifted image 8a is reversed.

First, the case of executing the division processing by the luminance arithmetic operation unit 10 in the manner described above will be described in details.

In this case, in the vicinity of the luminance value of the background region 5b (FIG. 5A) occupying most of the luminance frequency in the luminance-shifted image 8a and the reverse shifted image 9a, i.e., in the vicinity of the intermediate value (intermediate luminance value: luminance level 128) that is the most frequent value of the luminance levels when the display gradations are 256 gradation, the luminance levels in both the luminance-shifted image 8a and the reverse shifted image 9a are in the vicinity of 128. Thus, when the luminance arithmetic operation unit 10 executes the luminance division processing, each quotient as the corresponding luminance level of the division processed image (10a) as the processing result takes a value in the vicinity of 1.

Further, as shown in Equation 3, the gain K (e.g., K=128) is multiplied to the calculated quotient when the luminance value is extremely small. Thus, in the region (5b: FIG. 5A) where there are great number of pixels of the background, the luminance level does not change due to the division calculation, and the change becomes prominent for the regions of the luminance vale close to the intermediate value of the gradation or the regions id the vicinity of the intermediate value with small luminance difference.

In the meantime, the quotient of the luminance value of the luminance-shifted image 8a in the vicinity of the target object and the pixel position at the corresponding address position (x, y) in the reverse shifted image 9a becomes 1 or larger. By multiplying the gain 128, the luminance difference is more enlarged.

Figure 5C:
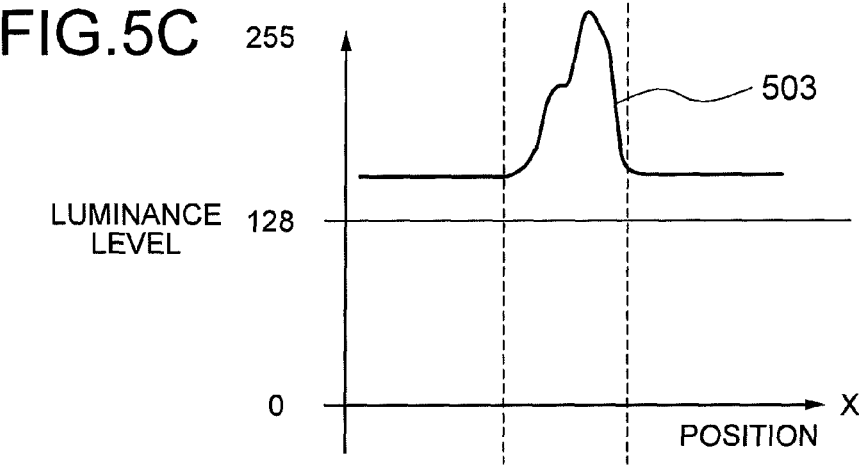
FIG. 5C is an explanatory chart showing a luminance profile of a subtraction processed image that is a result of performing subtraction processing on the image of FIG. 5B.

Therefore, as shown in a luminance profile 503 of FIG. 5C, the luminance variation of the background region is suppressed, and the luminance difference between the target object and the background region is increased.

Thereby, the contrast of the target object with respect to the background region in the image is enlarged, which makes it easy to extract the target object.

Figure 11:
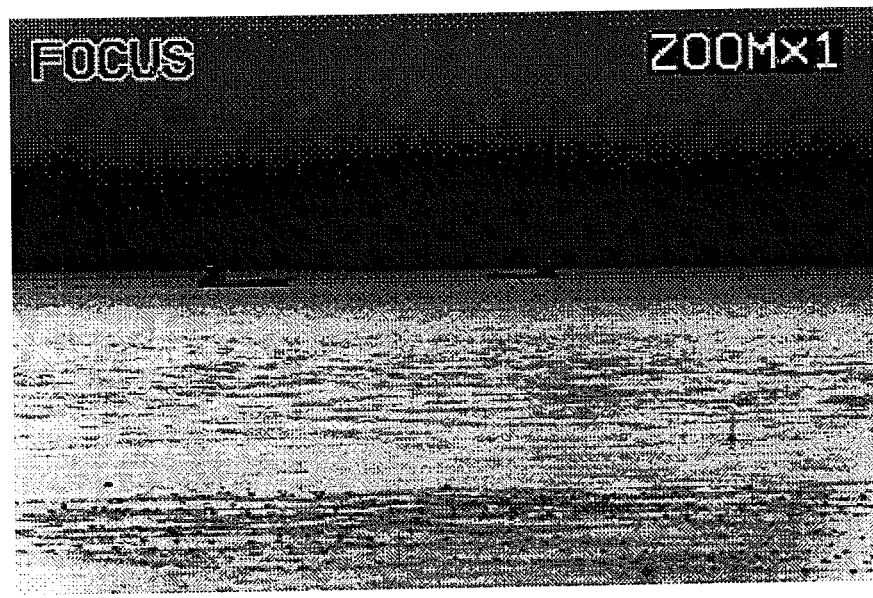
FIG. 11 is an explanatory chart showing an example of a division processed image that is acquired by executing division processing on the infrared image sensitivity-converted image disclosed in FIG. 9 by the image generation apparatus disclosed in FIG. 1.
Figure 12:
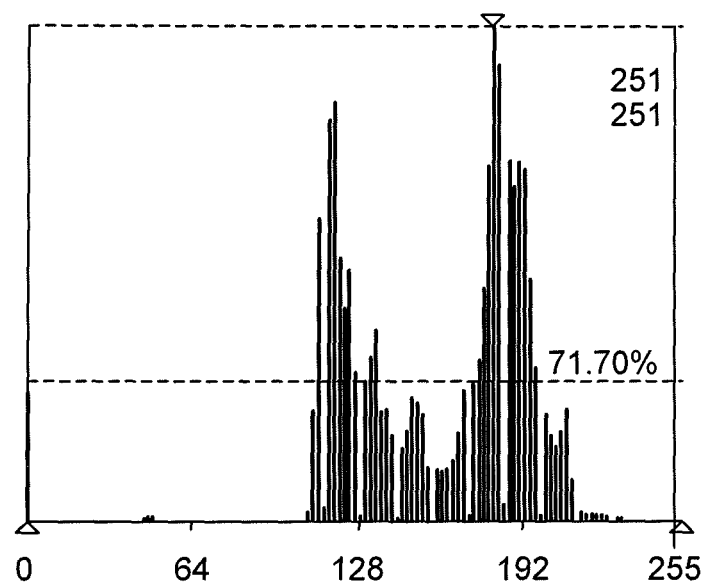
FIG. 12 is an explanatory chart showing an example of a luminance histogram of the division processed image disclosed in FIG. 11 by the image generation apparatus disclosed in FIG. 1.

FIG. 11 shows an example of the division processed image 10a as the division processing result of the luminance values of the luminance-shifted image 8a and the reverse shifted image 9a for the infrared resolution-converted-image shown in FIG. 9. Further, FIG. 12 shows a luminance histogram of the division processed image 10a shown in FIG. 11.

Then, the case of executing the subtraction processing by the luminance arithmetic operation unit 10 will be described in details.

In this case, the luminance difference between the luminance-shifted image 8a and the reverse shifted image 9a in the background region 5b (FIG. 8A) occupying most of the luminance frequency in the images of the luminance-shifted image 8a and the reverse shifted image 9a is calculated as a value in the vicinity of 0 as an extremely small luminance level by a calculation based on Equation 4 mentioned above.

Further, the luminance difference in the vicinity of the target object in the subtraction processed image 10a' as the processing result of the subtraction processing is enlarged as shown in a luminance profile 803 of FIG. 8C.

The luminance of the background region in this image comes to be in an equivalent luminance level (almost the same) as that of the luminance-shifted image 8a by adding the gain K (e.g., K=128). However, the difference in the luminance levels in the vicinity of the target object is enlarged, so that the contrast is improved (emphasized). Thus, the visibility of the target object is improved greatly.

Figure 13:
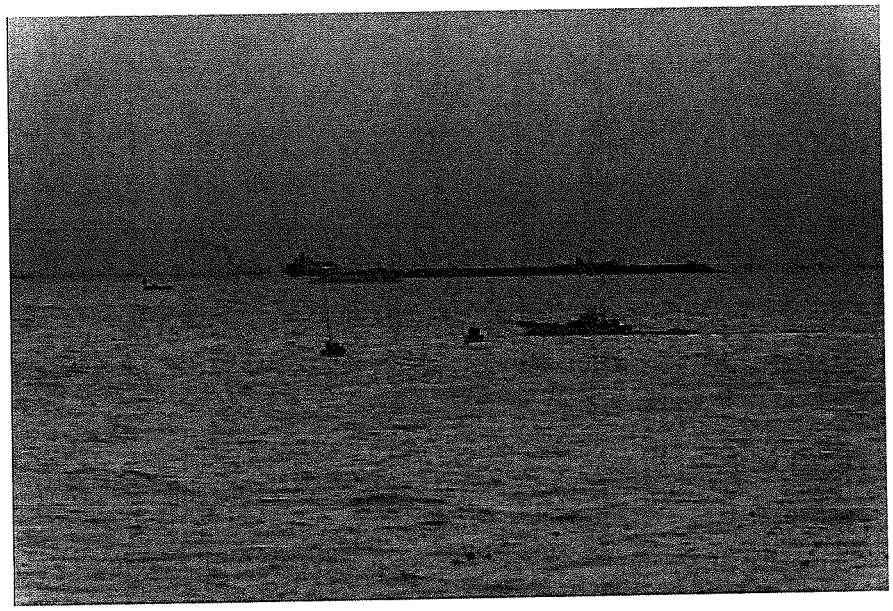
FIG. 13 is an explanatory chart showing an example of a subtraction processed image that is acquired by executing subtraction processing on the infrared image sensitivity-converted image disclosed in FIG. 9 by the image generation apparatus disclosed in FIG. 1.

FIG. 13 shows the subtraction processed image 10a' acquired when the subtraction processing is performed on the infrared resolution-converted image of FIG. 9 in the manner described above. FIG. 13 shows that the contrast of the ship as the target is emphasized effectively, and the visibility of the floating object between the waves is improved greatly compared to that of FIG. 9.

As described above, the luminance range width of the luminance distribution of the infrared image can be enlarged effectively through setting the luminance level of the background region (sea surface) occupying the most frequent value in the luminance histogram to the intermediate luminance value (128) of the gradation number and linearly converting the luminance level of the pixels other than those in the background region based on the intermediate luminance value. Thereby, as shown in FIG. 13, the contrast of the ship as the target can be emphasized effectively, and it is shown that the visibility of the ship is improved greatly compared to that of the infrared resolution-sensitivity-converted image (FIG. 9) before executing the luminance calculation processing.

In the exemplary embodiment, described is the case where the luminance arithmetic operation unit 10 executes either the division processing or the subtraction processing on the luminance-shifted image 8a and the reverse shifted image 9a of the infrared image. However, the subtraction processing exhibits an effect of eliminating white waves on the sea surface, so that it is also possible to employ a setting which performs processing for achieving greater enlarging of the luminance distribution width by executing a combination of the division processing and the subtraction processing.

This makes it possible to enlarge the contrast between the background and the target object in the processed image and, further, to increase the visibility of the travelling ship on the sea surface as the target object.

Then, the feature detection unit 11 generates a filtering image 11a by performing filtering processing on the division processed image 10a (or the subtraction processed image 10a') sent in from the luminance arithmetic operation unit 10 in step S5 for eliminating the luminance region (pixels) smaller than the luminance frequency set in advance in the image, and transmits it to the contrast enlarging unit 12 (step S6).

Thereby, the luminance in the vicinity of the most frequent value in the image (filtering image 11a) can be increased relatively.

The contrast enlarging unit 12 selects the region (referred to as "luminance region") of equal to or more than the luminance value set in advance in the inputted filtering image 11a, generates a contrast enlarged image 12a in which the contrast is enlarged by linearly enlarging the luminance range of the luminance region in such a manner that the vicinity of the most frequent value becomes the maximum based on the most frequent value of the selected luminance, and sends it to the binarization processing unit 13 (step S7).

Figure 14:
FIG. 14 is an explanatory chart showing an example of a binarization processed image that is acquired by executing binarization processing on the images (FIG. 11, FIG. 13) processed by the image generation apparatus disclosed in FIG. 1.

Then, the binarization processing unit 13 generates a binarization image 13a as shown in FIG. 14 by performing threshold value processing set in advance to the luminance of each pixel in the contrast enlarged image 12a (binarization processing), and outputs the binarization image 13a to the image display unit 5 (step S8).

Further, the binarization processing unit 13 may be set to extract the target object from the binarization image 13a outputted to the image display unit 5, and to display the target object with emphasis.

Note here that the binarization processing unit 13 superimposes a mark set by corresponding to the extracted target object on the target object within the binarization image 13a and displays the image, for example, as a method for providing the display with emphasis.

As described above, with the image identification supporting apparatus 100 as the embodiment, it is possible to effectively suppress the luminance variation of the background region occupying most of the luminance distribution in the image as the image processing target and to generate an image in which the luminance value of the target object with respect to the luminance of the background region, i.e., the luminance difference of the target object with respect to the background region, is enlarged.

Further, it is also possible to eliminate small noises having extremely small luminance difference within the image by performing division (subtraction) processing on the luminance-shifted image and the reverse shifted image and, further, to achieve an effect of enlarging the luminance difference.

Thus, it is possible to perform quick and effective image processing without requiring an expensive and complicated optical system and without executing processing with high calculation load such as histogram quantization and individual noise removal processing. Further, it becomes possible to extract the target object in an infrared image in which the temperature difference between the target and the background is small so that it is difficult to secure the contrast with respect to the background. Further, extraction of a floating object between the waves contained in the infrared image and dissipation of white waves and the like can be executed effectively.

The new technical contents of the above-described embodiment can be summarized as follows. While a part of or a whole part of the embodiment can be summarized as follows as the new technique, the present invention is not necessarily limited only to the followings.

(Supplementary Note 1)

An image generation apparatus which includes: an optical unit which condenses infrared rays from an image capturing target containing a target object and acquires a specific wavelength band from the condensed infrared rays; an uncooled infrared image sensor which generates an infrared image corresponding to a temperature of the image capturing target based on the wavelength acquired by the optical unit; and an image processing unit which generates an arithmetically processed image by performing arithmetic processing on luminance values of the infrared image, wherein the image processing unit includes: a resolution sensitivity conversion module which generates a plurality of different weight-averaged images corresponding to a plurality of weighted-filter image of different pixel numbers by performing a convolution operation of filter coefficients of each of the weighted-filter images and luminance values at corresponding positions in the infrared image, and generates a resolution-sensitivity-converted image by adding luminance differences of the pixels of the different weight-averaged images to respective luminance values of the corresponding pixels of the infrared image; a luminance histogram arithmetic operation module which generates a luminance histogram that shows appearing frequency of the luminance value of each pixel that forms the resolution-sensitivity-converted image; a luminance level adjusting module which sets a gradation range of the resolution-sensitivity-converted image to an enlarged range set in advance, sets a most frequently appearing luminance value that is a luminance value whose appearing frequency in the luminance histogram is the maximum to an intermediate value in the enlarged range as an intermediate luminance value, and generates a luminance-shifted image by linearly shifting each luminance value of the resolution-sensitivity-converted image by corresponding to the enlarged range and the intermediate luminance value; and a luminance arithmetic operation processing module which generates a reverse shifted image in which light and shade of luminance levels of the luminance-shifted image are reversed, and generates the arithmetically processed image by performing arithmetic processing based on differences in the luminance values of the corresponding pixels in each of the reverse shifted image and the luminance-shifted image.

(Supplementary Note 2)

The image generation apparatus as depicted in Supplementary note 1, wherein the luminance arithmetic operation processing module includes: a luminosity difference image setting function which calculates luminance level averaged values of the luminance-shifted image and the reverse shifted image, respectively, and sets one of the luminance-shifted image or the reverse shifted image as a high luminosity side image and the other image as a low luminosity side image, respectively, based on the luminance averaged values; and a subtraction processing function which generates the arithmetically processed image by executing frequency value subtraction processing for subtracting a frequency value of each pixel at corresponding position of the low luminosity side image from the luminance value of each pixel of the high luminosity side image as the arithmetic operation processing.

(Supplementary Note 3)

The image generation apparatus as depicted in Supplementary Note 1 or 2, wherein the luminance arithmetic operation processing module includes: a luminosity difference image setting function which calculates luminance level averaged values of the luminance-shifted image and the reverse shifted image, respectively, and sets one of the luminance-shifted image or the reverse shifted image as a high luminosity side image and the other image as a low luminosity side image, respectively, based on the luminance averaged values; and a division processing function which generates the arithmetically processed image by executing frequency value division processing for dividing the luminance value of each pixel of the high luminosity side image by a frequency value of each pixel at corresponding position of the low luminosity side image as the arithmetic operation processing.

(Supplementary Note 4)

The image generation apparatus as depicted in Supplementary Note 1 or 2, wherein the image processing unit includes: a filtering processing module which generates a filtering image by eliminating the luminance of the pixel in a luminance region less than the luminance frequency set in advance from the arithmetically processed image; a contrast enlarging module which performs enlarging processing of contrast the filtering image based on the luminance values contained in the filtering image; and a binarization processing module which performs processing for binarizing the pixel of the luminance level of equal to or more than a specific value in the arithmetically processed image.

(Supplementary Note 5)

The image generation apparatus as depicted in Supplementary Note 2, wherein: the luminance arithmetic operation processing module includes a luminosity difference image setting function which calculates luminance level averaged values of the luminance-shifted image and the reverse shifted image, respectively, and sets one of the luminance-shifted image or the reverse shifted image as a high luminosity side image and the other image as a low luminosity side image, respectively, based on the luminance averaged values, and a division processing function which generates the arithmetically processed image by executing frequency value division processing for dividing the luminance value of each pixel of the high luminosity side image by a frequency value of each pixel at corresponding position of the low luminosity side image as the arithmetic operation processing; and the image processing unit includes a filtering processing module which generates a filtering image by eliminating the luminance of the pixel in a luminance region less than the luminance frequency set in advance from the arithmetically processed image, a contrast enlarging module which performs enlarging processing of contrast the filtering image based on the luminance values contained in the filtering image, and a binarization processing module which performs processing for binarizing the pixel of the luminance level of equal to or more than a specific value in the arithmetically processed image.

(Supplementary Note 6)

An image generation method for generating an arithmetically processed image from an infrared image by using an image generation apparatus which includes: an uncooled infrared image sensor which condenses infrared rays from an image capturing target containing a target object and generates an infrared image from the infrared rays based on a temperature of the image capturing target; and an image processing unit which performs arithmetic processing on luminance values of the infrared image, and the method includes: generating weight-averaged images corresponding to a plurality of weighted-filter image of different pixel numbers by performing a convolution operation of filter coefficients of each of the weighted filter images and luminance values at corresponding positions in the infrared image, and generating a resolution-sensitivity-converted image by adding luminance differences of the pixels of the different weight-averaged images to respective luminance values of the corresponding pixels of the infrared image; generating a luminance histogram that shows appearing frequency of the luminance value of each pixel that forms the resolution-sensitivity-converted image; setting a gradation range of the resolution-sensitivity-converted image to an enlarged range set in advance; setting a most frequently appearing luminance value that is a luminance value whose appearing frequency in the luminance histogram is the maximum to an intermediate value in the enlarged range as an intermediate luminance value; generating a luminance-shifted image by linearly shifting each luminance value of the resolution-sensitivity-converted image by corresponding to the enlarged range and the intermediate luminance value; and generating a reverse shifted image in which light and shade of luminance levels of the luminance-shifted image are reversed, and generating the arithmetically processed image by performing arithmetic processing based on differences in the luminance values of the corresponding pixels in each of the reverse shifted image and the luminance-shifted image.

(Supplementary Note 7)

An image generation program for generating an arithmetically processed image from an infrared image to be used in an image generation apparatus which includes: an uncooled infrared image sensor which condenses infrared rays from an image capturing target containing a target object and generates the infrared image from the infrared rays based on a temperature of the image capturing target; and an image processing unit which performs arithmetic processing on luminance values of the infrared image, and the program causes a computer to execute: a resolution sensitivity conversion function which generates weight-averaged images corresponding to a plurality of weighted-filter image of different pixel numbers by performing a convolution operation of filter coefficients of each of the weighted-filter images and luminance values at corresponding positions in the infrared image, and generates a resolution-sensitivity-converted image by adding luminance differences of the pixels of the different weight-averaged images to respective luminance values of the corresponding pixels of the infrared image; a luminance histogram arithmetic operation function which generates a luminance histogram that shows appearing frequency of the luminance value of each pixel that forms the resolution-sensitivity-converted image; a luminance level adjusting function which sets a gradation range of the resolution-sensitivity-converted image to an enlarged range set in advance, sets a most frequently appearing luminance value that is a luminance value whose appearing frequency in the luminance histogram is the maximum to an intermediate value in the enlarged range as an intermediate luminance value, and generates a luminance-shifted image by linearly shifting each luminance value of the resolution-sensitivity-converted image by corresponding to the enlarged range and the intermediate luminance value; and a luminance arithmetic operation processing function which generates a reverse shifted image in which light and shade of luminance levels of the luminance-shifted image are reversed, and generates the arithmetically processed image by performing arithmetic processing based on differences in the luminance values of the corresponding pixels in each of the reverse shifted image and the luminance-shifted image.

While the present invention has been described heretofore by referring to the embodiment (and EXAMPLE), the present invention is not limited only to the embodiment (and EXAMPLE). Various changes and modifications occurred to those skilled in the art can be applied to the structures and details of the present invention without departing from the scope of the present invention.

This Application claims the Priority right based on Japanese Patent Application No. 2009-283504 filed on Dec. 14, 2009 and the disclosure thereof is hereby incorporated by reference in its entirety.

INDUSTRIAL APPLICABILITY

The present invention can be effectively employed to a system which automatically detects the target such as a navy ship by using an infrared image.

REFERENCE NUMERALS

1 Light focus dome
2 Optical unit
3 Uncooled infrared sensor (uncooled infrared image sensor)
4 Image processing unit
5 Image display unit
6 Resolution sensitivity conversion unit (resolution sensitivity conversion module)
7 Histogram calculating unit (luminance histogram arithmetic operation module)
8 Luminance shift calculating unit (luminance level adjusting module)
9 Reversed image processing unit (luminance arithmetic operation processing module)
10 Luminance arithmetic operation unit (luminance arithmetic operation processing module)
11 Feature detection unit
12 Contrast enlarging unit
13 Binarization processing unit

The invention claimed is:

1. An image generation apparatus, comprising:
an optical unit which condenses infrared rays from an image capturing target containing a target object and acquires a specific wavelength band from the condensed infrared rays; an uncooled infrared image sensor which generates an infrared image corresponding to a temperature of the image capturing target based on the wavelength acquired by the optical unit;
and an image processing unit which generates an arithmetically processed image by performing arithmetic processing on luminance values of the infrared image, wherein
the image processing unit comprises:
a resolution sensitivity conversion module which generates a plurality of different weight-averaged images corresponding to a plurality of weighted-filter image of different pixel numbers by performing a convolution operation of filter coefficients of each of the weighted-filter images and luminance values at corresponding positions in the infrared image, and generates a resolution-sensitivity-converted image by adding luminance differences of the pixels of the different weight-averaged images to respective luminance values of the corresponding pixels of the infrared image;
a luminance histogram arithmetic operation module which generates a luminance histogram that shows appearing frequency of the luminance value of each pixel that forms the resolution-sensitivity-converted image;
a luminance level adjusting module which sets a gradation range of the resolution-sensitivity-converted image to an enlarged range set in advance, sets a most frequently appearing luminance value that is a luminance value whose appearing frequency in the luminance histogram is the maximum to an intermediate value in the enlarged range as an intermediate luminance value, and generates a luminance-shifted image by linearly shifting each luminance value of the resolution-sensitivity-converted image by corresponding to the enlarged range and the intermediate luminance value; and
a luminance arithmetic operation processing module which generates a reverse shifted image in which light and shade of luminance levels of the luminance-shifted image are reversed, and generates the arithmetically processed image by performing arithmetic processing based on differences in the luminance values of the corresponding pixels in each of the reverse shifted image and the luminance-shifted image.

2. The image generation apparatus as claimed in claim 1, wherein
the luminance arithmetic operation processing module comprises:
a luminosity difference image setting function which calculates luminance level averaged values of the luminance-shifted image and the reverse shifted image, respectively, and sets one of the luminance-shifted image or the reverse shifted image as a high luminosity side image and the other image as a low luminosity side image, respectively, based on the luminance averaged values; and
a subtraction processing function which generates the arithmetically processed image by executing frequency value subtraction processing for subtracting a frequency value of each pixel at corresponding position of the low luminosity side image from the luminance value of each pixel of the high luminosity side image as the arithmetic operation processing.

3. The image generation apparatus as claimed in claim 1, wherein
the luminance arithmetic operation processing module comprises:
a luminosity difference image setting function which calculates luminance level averaged values of the luminance-shifted image and the reverse shifted image, respectively, and sets one of the luminance-shifted image or the reverse shifted image as a high luminosity side image and the other image as a low luminosity side image, respectively, based on the luminance averaged values; and
a division processing function which generates the arithmetically processed image by executing frequency value division processing for dividing the luminance value of each pixel of the high luminosity side image by a frequency value of each pixel at corresponding position of the low luminosity side image as the arithmetic operation processing.

4. The image generation apparatus as claimed in claim 1, wherein
the image processing unit comprises:
a filtering processing module which generates a filtering image by eliminating the luminance of the pixel in a luminance region less than the luminance frequency set in advance from the arithmetically processed image;
a contrast enlarging module which performs enlarging processing of contrast the filtering image based on the luminance values contained in the filtering image; and
a binarization processing module which performs processing for binarizing the pixel of the luminance level of equal to or more than a specific value in the arithmetically processed image.

5. The image generation apparatus as claimed in claim 2, wherein:
the luminance arithmetic operation processing module comprises
a luminosity difference image setting function which calculates luminance level averaged values of the luminance-shifted image and the reverse shifted image, respectively, and sets one of the luminance-shifted image or the reverse shifted image as a high luminosity side image and the other image as a low luminosity side image, respectively, based on the luminance averaged values, and
a division processing function which generates the arithmetically processed image by executing frequency value division processing for dividing the luminance value of each pixel of the high luminosity side image by a frequency value of each pixel at corresponding position of the low luminosity side image as the arithmetic operation processing; and
the image processing unit comprises
a filtering processing module which generates a filtering image by eliminating the luminance of the pixel in a luminance region less than the luminance frequency set in advance from the arithmetically processed image,
a contrast enlarging module which performs enlarging processing of contrast the filtering image based on the luminance values contained in the filtering image, and
a binarization processing module which performs processing for binarizing the pixel of the luminance level of equal to or more than a specific value in the arithmetically processed image.

6. An image generation method for generating an arithmetically processed image from an infrared image by using an image generation apparatus which comprises: an uncooled infrared image sensor which condenses infrared rays from an image capturing target containing a target object and generates an infrared image from the infrared rays based on a temperature of the image capturing target; and an image processing unit which performs arithmetic processing on luminance values of the infrared image, the method comprising:
generating weight-averaged images corresponding to a plurality of weighted-filter image of different pixel numbers by performing a convolution operation of filter coefficients of each of the weighted filter images and luminance values at corresponding positions in the infrared image, and generating a resolution-sensitivity-converted image by adding luminance differences of the pixels of the different weight-averaged images to respective luminance values of the corresponding pixels of the infrared image;
generating a luminance histogram that shows appearing frequency of the luminance value of each pixel that forms the resolution-sensitivity-converted image;
setting a gradation range of the resolution-sensitivity-converted image to an enlarged range set in advance;
setting a most frequently appearing luminance value that is a luminance value whose appearing frequency in the luminance histogram is the maximum to an intermediate value in the enlarged range as an intermediate luminance value;
generating a luminance-shifted image by linearly shifting each luminance value of the resolution-sensitivity-converted image by corresponding to the enlarged range and the intermediate luminance value; and
generating a reverse shifted image in which light and shade of luminance levels of the luminance-shifted image are reversed, and generating the arithmetically processed image by performing arithmetic processing based on differences in the luminance values of the corresponding pixels in each of the reverse shifted image and the luminance-shifted image.

7. A non-transitory computer readable recording medium storing an image generation program for generating an arithmetically processed image from an infrared image to be used in an image generation apparatus which comprises: an uncooled infrared image sensor which condenses infrared rays from an image capturing target containing a target object and generates the infrared image from the infrared rays based on a temperature of the image capturing target; and an image processing unit which performs arithmetic processing on luminance values of the infrared image, the program causing a computer to execute:
a resolution sensitivity conversion function which generates weight-averaged images corresponding to a plurality of weighted-filter image of different pixel numbers by performing a convolution operation of filter coefficients of each of the weighted-filter images and luminance values at corresponding positions in the infrared image, and generates a resolution-sensitivity-converted image by adding luminance differences of the pixels of the different weight-averaged images to respective luminance values of the corresponding pixels of the infrared image;
a luminance histogram arithmetic operation function which generates a luminance histogram that shows appearing frequency of the luminance value of each pixel that forms the resolution-sensitivity-converted image;
a luminance level adjusting function which sets a gradation range of the resolution-sensitivity-converted image to an enlarged range set in advance, sets a most frequently appearing luminance value that is a luminance value whose appearing frequency in the luminance histogram is the maximum to an intermediate value in the enlarged range as an intermediate luminance value, and generates a luminance-shifted image by linearly shifting each luminance value of the resolution-sensitivity-converted image by corresponding to the enlarged range and the intermediate luminance value; and
a luminance arithmetic operation processing function which generates a reverse shifted image in which light and shade of luminance levels of the luminance-shifted image are reversed, and generates the arithmetically processed image by performing arithmetic processing based on differences in the luminance values of the corresponding pixels in each of the reverse shifted image and the luminance-shifted image.

8. An image generation apparatus, comprising:

optical means for condensing infrared rays from an image capturing target containing a target object and acquiring a specific wavelength band from the condensed infrared rays; an uncooled infrared image sensor means for generating an infrared image corresponding to a temperature of the image capturing target based on the wavelength acquired by the optical means; and image processing means for generating an arithmetically processed image by performing arithmetic processing on luminance values of the infrared image, wherein the image processing means comprises:

resolution sensitivity conversion means for generating a plurality of different weight-averaged images corresponding to a plurality of weighted-filter image of different pixel numbers by performing a convolution operation of filter coefficients of each of the weighted-filter images and luminance values at corresponding positions in the infrared image, and generating a resolution-sensitivity-converted image by adding luminance differences of the pixels of the different weight-averaged images to respective luminance values of the corresponding pixels of the infrared image;

luminance histogram arithmetic operation means for generating a luminance histogram that shows appearing frequency of the luminance value of each pixel that forms the resolution-sensitivity-converted image;

luminance level adjusting means for setting a gradation range of the resolution-sensitivity-converted image to an enlarged range set in advance, setting a most frequently appearing luminance value that is a luminance value whose appearing frequency in the luminance histogram is the maximum to an intermediate value in the enlarged range as an intermediate luminance value, and generating a luminance-shifted image by linearly shifting each luminance value of the resolution-sensitivity-converted image by corresponding to the enlarged range and the intermediate luminance value; and luminance arithmetic operation processing means for generating a reverse shifted image in which light and shade of luminance levels of the luminance-shifted image are reversed, and generating the arithmetically processed image by performing arithmetic processing based on differences in the luminance values of the corresponding pixels in each of the reverse shifted image and the luminance-shifted image.

* * * * *